2,736,694
HYDRAZINE PRODUCTION

Harry E. Gunning, Hazelcrest, and Charles Cameron McDonald, Chicago, Ill., assignors to Illinois Institute of Technology, Chicago, Ill., a corporation of Illinois No Drawing. Application August 25, 1952,
Serial No. 306,302

2 Claims. (Cl. 204—157)

Our invention relates to an improved method for producing hydrazine, and more particularly, an improved method for producing hydrazine by mercury photosensitization of ammonia.

Hydrazine is a chemical which has been found recently to possess a great number of valuable industrial uses. Hydrazine is one of the principal constituents in rocket fuel. Also, it has unusual properties as a reducing agent, for example, in the reduction of silver or the like metal salt solutions in spraying processes. In organic chemistry, hydrazine is now being used extensively in the development of new drugs and various bio-chemicals and dyes.

The processes for producing hydrazine heretofore available to the art, however, leave much to be desired, and the production processes now employed commercially are extremely expensive.

It is, therefore, an object of the present invention to provide an improved method for producing hydrazine.

It is a further object of the instant invention to provide an improved method for producing anhydrous hydrazine from an anhydrous reaction medium.

It is an additional object of the instant invention to provide a process for producing hydrazine in a vapor phase by means of a process suitable for continuous operation.

It is still another object of the instant invention to provide an improved method of producing hydrazine by the use of inexpensive starting materials.

It is still a further important object of the instant invention to provide an improved process for obtaining high yields of hydrazine.

It is yet another object of the instant invention to provide an improved process of producing hydrazine that comprises subjecting a fast flowing stream of ammonia and mercury vapor to light having wave lengths ranging from 1800 to 2600 A.

It is yet a further object of the instant invention to provide an improved process for producing hydrazine by mercury photosensitization of ammonia to yield hydrazine, that comprises subjecting a fast flowing stream of ammonia to photosensitized mercury vapor and, immediately thereafter, reducing the number of photosensitized mercury-hydrazine collisions.

Other objects, features and advantages of the present invention will become apparent to those skilled in the art from the following detailed description of a preferred embodiment of our invention.

It is known that mercury vapor absorbs light in accordance with the following photochemical equations:

(1) $\quad \text{Hg } 6(\text{'S}_0) + h\nu(1849 \text{ A.}) \rightarrow \text{Hg } 6(\text{'P}_1)$ (2) $\quad \text{Hg } 6(\text{'S}_0) + h\nu(2537 \text{ A.}) \rightarrow \text{Hg } 6(^3\text{P}_1)$ wherein $h\nu(1849 \text{ A.})$ and $h\nu(2537 \text{ A.})$ represent quanta of light of wave lengths 1849 A. and 2537 A. respectively; and Hg 6('S$_0$) represents ground state or unsensitized mercury atoms, Hg 6('P$_1$) represents mercury atoms which have been photosensitized by absorption of light of wave length 1849 A. and such atom may be referred to as "singlet atoms," and Hg 6($^3$P$_1$) represents mercury atoms which have been photosensitized by absorption of light of wave length 2537 A. and such atoms may be referred to as "triplet atoms." The energy-rich singlet and triplet atoms are respectively 154.6 and 112.6 kilocalories per mol above the so-called "ground state."

In the absence of a foreign gas (F. G.), such as ammonia, the singlet and triplet atoms undergo fluorescence to lose their energy in extremely short times, in the neighborhood of 10$^{-9}$ and 10$^{-7}$ seconds respectively; but in presence of the foreign gas they may collisionally transfer their energy to the foreign gas molecules by a process called "quenching," which may be represented as follows:

(3) $\quad \text{Hg } 6(\text{'P}_1) + \text{F. G.} \rightarrow \text{F. G. **} + \text{Hg } 6(\text{'S}_0)$ (4) $\quad \text{Hg } 6(^3\text{P}_1) + \text{F. G.} \rightarrow \text{F. G. *} + \text{Hg } 6(\text{'S}_0)$ wherein the asterisks denote collisionally energized foreign gas molecules. Such energized molecules may then decompose, since the energy transferred thereto is sufficient to cause dissociation of chemical bonds therein, and the foreign gas has then been subjected to "mercury photosensitization."

Our invention relates to the mercury photosensitization of ammonia to produce hydrazine, which presumably involves the ammonia in the following reaction:

(5) $\quad 2\text{NH}_3^* \rightarrow 2\text{NH}_2 + 2\text{H} \rightarrow \text{H}_2\text{N---NH}_2 + \text{H}_2$ It has been suggested that hydrazine may be produced by the mercury photosensitization of ammonia; however, the prior workers in the art have been unable to obtain hydrazine in more than trace quantities by carrying out such reaction. The prior workers in the art subjected ammonia to mercury photosensitization under substantially static or slow flow conditions. The net result was the production of some nitrogen (N$_2$) and some hydrogen (H$_2$), but only traces of hydrazine.

The instant invention is based upon the discovery that certain reactions other than the reaction of Equation 5 take place in competition with the reaction of Equation 5 during the mercury photosensitization of amomnia. Such additional reactions or side reactions tend to destroy the hydrazine as soon as it is formed, in accordance with the reaction of Equation 5. In other words, it is not true that the reaction of Equation 5 actually takes place to so little an extent that it is wholly insignificant, as prior workers in the art have indicated. Instead, the instant invention is based upon the discovery that the reaction of Equation 5 does take place to a substantial extent, but that other competing reactions also take place under the conditions heretofore employed by the workers in the art to such an extent that these competing reactions predominate under the conditions heretofore employed.

Our invention consists in an improved process for producing hydrazine by mercury photosensitization of ammonia to yield hydrazine, that comprises subjecting a fast flowing stream of ammonia to photosensitized mercury vapor and, immediately thereafter, reducing the number of photosensitized mercury-hydrazine collisions.

It has been found that the mercury photosensitization of ammonia involves several different and competing reactions, which it is believed may be represented as follows:

(6) $\quad \text{NH}_3 + \text{Hg6('P}_1) \rightarrow \text{NH}_2 + \text{H} + \text{Hg6('S}_0)$ (7) $\quad \text{NH}_2 + \text{NH}_2 \rightarrow \text{H}_2\text{N---NH}_2$ (8) $\quad \text{H}_2\text{N---NH}_2 + \text{Hg6('P}_1) \rightarrow 2\text{NH}_2 + \text{Hg6('S}_0)$ and perhaps (9) $\quad 2\text{NH}_2 + \text{Hg6('P}_1) \rightarrow \text{N}_2 + 2\text{H}_2 + \text{Hg6('S}_0)$ It may also be that the apparent reaction chain indicated by Reactions 7 and 8 is interrupted only by wall-contact decomposition of free amino (—NH₂) radicals to yield N₂ and H₂.

Reactions similar to 6, 8 and 9 also are believed to take place involving the triplet atom, Hg6($^3P_1$), and these reactions are further complicated by the fact that the triplet atom has two other closely related energy stages designated by the symbols Hg6($^3P_0$) and Hg6($^3P_2$) to which such atom may change prior to reverting to the ground state, Hg6($^1S_0$).

It will thus be seen that in an ammonia and mercury vapor mixture the radiation is first absorbed by the mercury vapor to form energy-rich singlet and/or triplet atoms. Reaction is then initiated by the transfer of all or part of the energy of such atoms to the ammonia molecules admixed therewith. In the case of the triplet atoms the reaction may be initiated by direct transfer of all of its energy to the ammonia molecule, or a portion of the energy-rich triplet atoms may first be converted by collision with the ammonia molecules to one of two other energy states, and the chemical reaction may then be initiated by the subsequent collisions of these mercury atoms (in the collisionally induced energy states) with the ammonia molecules present. It so happens that these last mentioned mercury atoms, in the collisionally induced energy states, tend to lose their energy much more slowly than do the initial radiationally energized singlet and triplet atoms. As will be appreciated, these variations in the rates at which the various energy-rich mercury atoms give off their energy greatly complicates the overall picture and, it is believed, explain why the prior workers were unable to obtain hydrazine yields.

The reaction of Equation 6 furnishes the amino groups which are the reactive participants for the reaction of the Equation 7, and the reaction of Equation 7 furnishes hydrazine which is one of the reactive participants for the reaction of Equation 8. In a static and a slow flow system it is not important whether or not certain reactions take place successively or simultaneously. The principal problem in such a system is the rate at which each of the reactions takes place. In the mercury photosensitization of ammonia, it appears that the reaction of Equation 8 takes place at substantially the same rate as that of the reaction of Equation 7, since no appreciable hydrazine yield is obtained in the static system.

In the instant invention, the fact that the reactions of Equations 6, 7 and 8 take place successively is exploited by the use of a fast flowing stream of ammonia. Such a fast flowing stream of ammonia tends to prevent the establishment of what might be considered true equilibrium conditions. Fast flow or turbulent flow is thereby distinguished from static or substantially static (viscous or streamline) flow. The latter type of flow ordinarily leads to the establishment of a true equilibrium, whereas the former type of flow may be used to advantage in separating the zones wherein each of several successively occurring reactions may predominate or take place most effectively.

Thus, in the mercury photosensitization of a fast flowing stream of ammonia, several successive reaction zones may be established, in accordance with the principles of the instant invention. The reaction of Equation 6, of course, takes place continuously throughout the entire irradiation zone (i. e., the zone in which the stream of ammonia is exposed to the activating light source). However, in the initial upstream portion of the irradiation zone, there is a reaction zone (A) wherein the reaction of Equation 6 predominates. In a reaction zone (B) immediately following the reaction zone (A), the reaction of Equation 7 predominates. A third reaction zone (C) directly following or downstream from reaction zone (B) has as its predominating reaction, the reaction of Equation 8. Apparently, reactions such as the reaction of Equation 9 and the wall-contact decomposition of free amino radicals are comparatively slower than the reaction of Equation 7 which involves the combination of amino radicals to form hydrazine instead of the decomposition of the amino radicals. The instant invention involves a method of establishing reaction zones (A), (B) and (C) with sufficient distinctness to permit interference with the reaction of Equation 8 in zone (C) without undue interference with the other reactions tending to form hydrazine.

One of the requirements for the activating light which may be used in the instant process is that such light must be capable of absorption by mercury vapor. Mercury vapor absorbs light of wave length 1849 A. (actually 1849.6 A. plus or minus 1 A. depending upon the vapor temperature) to form the energy-rich singlet atom, and light of wave length 2537 A. (actually 2537.5 A. plus or minus 1 A. depending upon the vapor temperature) to form the triplet atom. For the purpose of the instant invention, the operative activating light may be light having some of its radiation of wave length 1849 and/or wave length 2537, and it may thus be light having wave lengths ranging from 1800 to 2600 A., or it may be light having most of its energy emitted as light of wave length 1849 A. and/or light of wave length 2537 A. Since conditions here involved do not prevent the absorption of light by the ammonia molecules for radiation of wave lengths other than 1849 A. and 2537 A. it may be that such radiations would not be wasted in the instant process. We mention this, since ammonia absorbs light of wave lengths ranging from 2400 A. to well into the vacuum ultraviolet light region, and the present conditions are favorable for the photolysis of ammonia to yield hydrazine, although under the preferred conditions for the instant invention the mercury photosensitization reaction predominates to a very substantial extent.

Preferably, however, the light source used in the instant invention is one having substantially all of its total energy emitted as light of wave length 1849 A. and/or of wave length 2537 A. Such a light source may thus be essentially monochromatic in that most of its total energy is emitted as light of wave length 1849 A. or more preferably, it is a monochromatic light source of predominately 2537 A. wave length radiation (which would not require the use of quartz to obtain suitable transmission thereof). Most preferably, the light source is essentially dichromatic, as will be described hereinafter, having at least about 90% of its total energy emitted as light of wave length 1849 A. and of wave length 2537 A.

The selection of intensity of the light source is essentially a matter of experiment for those skilled in the art, since it is obvious that light of sufficient intensity to obtain an appreciable amount of reaction must be employed.

In the vapor mixture exposed to the activatingly absorbable light (i. e., light of wave length 1849 A. and/or 2537 A.) the predominant gas present is, of course, ammonia, although other gases substantially inert with respect to the light, the energy-rich mercury atoms and the reaction products may be employed. Such inert gases include helium and nitrogen, and probably the only advantage in using such gases would be for the purpose of adjusting the operating vapor pressure as desired. Preferably only ammonia and mercury vapor are used.

The partial pressure of ammonia should be at least 5 mm. of Hg since this is the amount required to effect complete quenching of the energy-rich mercury atoms. The partial pressure of mercury vapor, on the other hand, should be such that complete absorption of the activating or sensitizing light may be accomplished in the light path employed. For example, if the light path or thickness of the vapor stream exposed to the light source is only 10 cm., then the mercury vapor partial pressure should be about $2 \times 10^{-5}$ mm. of Hg to avoid waste of light energy. A light path of 200 cm. requires a partial pressure of only $10^{-6}$, and a light path of 10,000 cm. requires a partial pressure of only $10^{-9}$. As a practical matter the mercury vapor partial pressure should not be less than about $10^{-7}$ mm. of Hg, although in large apparatus or under unusual conditions less might be employed. The maximum mercury vapor partial pressure is, of course, "saturation" partial pressure which depends upon the operating temperature employed, as is shown below:

| Saturation partial pressure (mm. of Hg) | Temperature, ° C. |
|---|---|
| $1.8 \times 10^{-5}$ | $-20$ |
| $1.9 \times 10^{-4}$ | $-0$ |
| $1.2 \times 10^{-3}$ | $+20$ |
| $6 \times 10^{-3}$ | $+40$ |

Preferably the mercury vapor partial pressure ranges from about $2 \times 10^{-5}$ to saturation. Although supersaturation may be used under special condition, the simplest and most conveniently handled process of the invention employs the ammonia vapor saturated with mercury vapor.

As hereinbefore mentioned, the optimum flow rate for the ammonia and mercury vapor stream is essentially an experimental matter to be ascertained on the basis of the apparatus and the conditions used. The essential purpose of the use of the fast flow rate in combination with activatingly absorbable light is the segregation of the various zones wherein each of the foregoing reactions is understood to predominate, so that interference with the reaction or reactions tending to reduce the hydrazine yield may be suitably accomplished.

Such reactions may involve inhibition of hydrazine formation, but it is believed that the most effective of such reactions involves destruction of hydrazine already formed. Experimental results tend to establish that the reaction is one such as is represented in Equation 8 above, although it is believed that not the singlet atom but the triplet atom is the one which functions most effectively in destroying hydrazine in accordance with the reaction of Equation 8.

The reaction temperature in the irradiation zone or portion of the ammonia stream exposed to activating light may range from about $-20°$ C. to about $40°$ C. At temperatures below about $-20°$ C. there is a tendency toward condensation of the ammonia, which would interfere with the vapor phase reaction. At temperatures above about $40°$ C. there is a tendency toward thermal decomposition of the hydrazine product particularly upon contact of the hydrazine with the walls of the reaction vessel adjacent the irradiation zone. Preferably, the mercury photosensitization reaction is carried out within the temperature range of about $0°$ C. to about $30°$ C., and the optimum reaction temperature is about room temperature.

Since the instant reaction is a vapor phase reaction, the temperatures employed are dependent to a substantial extent upon the pressure employed. On the other hand, the pressure employed should not exceed a pressure such that requires temperatures above $40°$ C. in order to maintain a vapor phase, since excessive thermal decomposition of hydrazine takes place at such temperatures. Also, the upstream pressure of the ammonia entering the irradiation zone should be at least sufficient to impart fast flowing properties to the ammonia stream. In general, the pressure of the ammonia stream entering the irradiation zone may range from about 5 pounds per square inch absolute pressure to about 100 pounds per square inch absolute pressure. Preferably, the upstream pressure ranges from about 1 to 2 atmospheres and the optimum upstream pressure is about 1 atmosphere.

It is an additional advantage of the instant invention that the process may be carried out under anhydrous conditions, in the absence of water or water vapor in the reaction mixture, so as to produce hydrazine initially in its anhydrous form.

The apparatus used for conducting a stream of ammonia into and through the irradiation zone and for admixing mercury vapor therewith may be of any suitable size and shape, having the various temperature and pressure control mechanisms therefor which may be desired. The walls of the reaction vessel or the walls surrounding the irradition zone may be of any suitable non-corrosive material, preferably, the walls are made of a material which catalyzes the formation of hydrogen molecules from hydrogen atoms.

The light source for the irradiation zone is preferably directly connected to, forming a part of, or inclosed within the reaction vessel surrounding the irradiation zone. For example, a quartz window may be used to form a direct connection between the irradiation zone and the light source. Most preferably, the light source is mounted within the reaction vessel, so that light given off in all directions from the light source may be absorbed by the vapor stream. The light source is preferably a stable high intensity lamp, which operates at room temperatures and emits a major portion of its energy in the region of maximum absorption by mercury vapor. The lamp should convert electrical energy into radiant energy with high efficiency. It has been found that a mercury-in-quartz rare gas discharge tube is particularly useful as a light source for the instant invention. Such a lamp comprises an optical quartz envelope containing mercury vapor and an inert gas at a pressure of about 2–12 mm. of mercury and it operates from a high voltage luminous tube transformer. Such a light source is essentially dichromatic, in that approximately 94% of its total energy is emitted as light of wave length 1849 A. and of wave length 2537 A.

The mercury photosensitization of ammonia to yield hydrazine may be demonstrated as follows:

A cylindrical glass irradiation zone about 3 cm. in diameter and about 10 cm. in length is connected to a trap and a receiver in series. The irradiation zone contains a mercury-in-quartz rare gas lamp hereinbefore described which supplies light of suitable intensity and of wave lengths 1849 A. and 2537 A. throughout the irradiation zone. The trap consists of a downwardly extending closed test-tube-like chamber having an inlet and an exit near the top. The trap inlet communicates directly with the irradiation zone so as to have about 2–5 cm. of travel therebetween. The trap is equipped with a centrally depending smaller test-tube shaped cold finger, which forms a seal at the top of the trap and extends about half the distance downwardly therein, so as to form an average travel path of about 10 cm. from the trap inlet to the trap exit. The receiver is a downwardly extending closed test-tube-like chamber having an exit to the air near the top and an inlet communicating with the exit of the trap and extending centrally about half-way down into the receiver (a total distance of about 20 cm. from the trap exit).

At the inlet of the irradiation zone there is positioned a mercury trap wherein mercury is heated so that the ammonia stream passing thereover will be saturated with mercury vapor before entering the irradiation zone.

A stream of ammonia (at atmospheric pressure and room temperature) flowing at a rate of about 2.8 liters per minute is passed through the irradiation zone, into the trap and around the cold finger therein and out the exit thereof, and into the receiver. The receiver is cooled by exposure of the outer walls thereof to Dry Ice-acetone (about $-78°$ C.). Complete condensation of all of the condensable gases present (ammonia and hydrazine) is thus effected in the trap and receiver system. No ammonia is vented to the air from the receiver. The rate of production of hydrazine is $4.1 \times 10^{-6}$ mols per minute; the rate of production of hydrogen is $40.2 \times 10^{-6}$ mols per minute; the rate of production of nitrogen is $10.8 \times 10^{-6}$ mols per minute; and the rate of consumption of ammonia is $31.9 \times 10^{-6}$ mols per minute. The percent of ammonia consumed that is converted to hydrazine is 24%.

The foregoing demonstration, hereinafter referred to as run A, proves that hydrazine may be produced in substantially more than trace quantities by passing a fast flowing stream of ammonia and mercury vapor through a suitable irradiation zone. Presumably, that phenomenon can be explained on the basis of the sequence in which the reaction for producing hydrazine and for destroying hydrazine take place. In other words, considering a given infinitely small increment of the irradiation zone, it can be assumed that the reactions for producing and for destroying hydrazine are taking place simultaneously at substantially the same rate. However, the amount of hydrazine introduced into the incremental zone is not only that produced therein by the hydrazine producing reaction but also an amount of hydrazine carried over from the previous incremental zone. The fact that some hydrazine must always be carried over from a previous upstream incremental zone is supported, logically, by the fact that production of hydrazine must necessarily take place before destruction thereof and, experimentally, by the presence of hydrazine in the receiver.

Also, it seems clear that the activating light is necessary for the hydrazine destroying reaction (as well as for the hydrazine producing reaction). Otherwise, destruction of the hydrazine will take place after the stream leaves the irradiation zone, at which time the activating effect of light upon the production of hydrazine has ceased.

It is now believed that the hydrazine destroying reaction is a function of the number of sensitized or photosensitized mercury-hydrazine collisions (per mol of hydrazone) which takes place in the irradiation zone. Accordingly, in the practice of the instant invention, the hydrazone yield may be increased by reducing the number of such collisions that take place during irradiation of the stream. One method for accomplishing such a reduction in collisions involves interfering physically with the mercury vapor-hydrazine collisions.

Since the number of collisions between molecules or atoms in a vapor phase system is a function of the pressure, in that reduction of the pressure increases the amount of travel for each of the molecules or atoms in between collisions thereof, a pressure reduction or pressure drop across the irradiation zone interferes with the mercury vapor-hydrazine collisions. The effect of a pressure drop across the irradiation zone in the process of the instant invention may be demonstrated by carrying out the following procedure:

A procedure, run B, that is the same as the procedure of run A except that the receiver is cooled to about $-195°$ C. by the use of liquid nitrogen is carried out; and the rate of production of hydrazine is $10.6 \times 10^{-6}$ mols per minute; the rate of production of hydrogen is $48.4 \times 10^{-6}$ mols per minute; the rate of production of nitrogen is $11.7 \times 10^{-6}$ mols per minute; and the rate of consumption of ammonia is $46.4 \times 10^{-6}$ mols per minute. The percent of the ammonia consumed that is converted to hydrazine is 43%.

One explanation for the superior result obtained in the latter of the two runs resides in the fact that liquid ammonia not cooled below $-78°$ C. has a partial pressure and that partial pressure of ammonia condensing in the receiver system may exert a back pressure at that point in the system. It can thus be seen that by reducing the receiver temperature to $-195°$ C. it is possible to effect substantially complete condensation of the ammonia and substantially complete cooling of the liquid ammonia resulting therefrom to such an extent that the vapor pressure of the liquid ammonia is negligible and there is no back pressure at the condensing surface in the system.

The foregoing runs demonstrate the significance of increasing the pressure drop across the irradiation zone. As a matter of practice, an appreciable improvement in the hydrazine yield in a given system may be obtained by increasing the pressure drop across the irradiation zone as little as an amount equal to about 5 inches of water. The friction effected pressure drop in the instant apparatus is negligible, being in the neighborhood of $10^{-6}$ inches of water, and so even the minimum effective pressure drop is many times greater. The maximum amount of pressure drop which may be used is limited solely by the limitations in the pressure and the temperature for carrying out the vapor phase reaction. Preferably, the amount of pressure drop across the irradiation zone is at least that equivalent to about 20 inches of water; and the optimum amount of pressure drop which may be obtained for most practical purposes is approximately 1 atmosphere or 15 pounds per square inch.

The pressure drop across the irradiation zone in a closed system, such as the system herein described, may also be expressed in terms of the temperature drop of the ammonia stream. For example, the maximum temperature drop may range from the maximum permissible reaction temperature in the irradiation zone (which is about $40°$ C.) to the minimum practicable condenser surface temperature (which is about $-195°$ C.). It should be appreciated that the precise temperature of the ammonia stream being condensed by a condenser surface maintained at $-195°$ C. can be obtained only with great difficulty. However, the condenser surface temperature herein referred to mean the surface temperatures of condenser surfaces which are not appreciably overloaded, i. e., which are sufficiently large to condense completely the stream of ammonia coming into contact therewith without the necessity of appreciable back pressure in the ammonia stream building up against the condensation surfaces.

The maximum possible temperature drop is thus from $40°$ C. to $-195°$ C. Preferably, the temperature drop employed is from room temperature to at least $-100°$ C.; and the minimum temperature drop which can ordinarily be employed to obtain an adequate pressure drop is from about room temperature to at least about $-35°$ C., which is comparable to a temperature differential of at least about $50°$ C. The maximum condenser surface temperature which may be employed in a closed system is approximately $-35°$ C., in order to be assured of satisfactory condensation, since the boiling point of ammonia is $-33°$ C. Ideally, the condenser surface is sufficiently cold to condense the ammonia and almost simultaneously cool the liquid to at least $-78°$ C.; and the condenser surface temperatures of below $-100°$ C. are ordinarily needed for such a purpose.

In an open flow system, which is a system wherein all of the condensable ammonia vapors are not condensed and the receiver temperatures are sufficiently low to be certain of effecting condensation of the hydrazine product, substantially the same pressure drop as that hereinbefore specified is required in order to obtain the advantageous increase in yield obtained in the instant process. Such a pressure drop may be obtained by the use of extremely high linear velocities in the ammonia stream and by, for example, expanding substantially the reaction chamber throughout or just back of the irradiation zone.

As will be appreciated, the increased pressure drop from that employed in run A to that employed in run B results in an increase in the linear velocity of the ammonia molecules and mercury atoms passing through the irradiation zone.

It so happens, however, that the conditions of runs A and B call for the use of light of wave lengths 1849 A. and 2537 A. Mercury photosensitization by the use of both singlet and triplet atoms is thus taking place. Actually the lamp employed emits most of its energy as light of wave length 2537 A. so that 80% of the photosensitization energy is supplied by the triplet atoms and the remaining 20% is supplied by the singlet atoms. Under such conditions, wherein at least about 10–20% of the photosensitization energy is supplied by the singlet atoms, it is possible to obtain appreciable yields using contact times of not more than about two seconds, and preferably less than about one-half second, and the linear velocities employed may be as low as about 100 cm. per minute. Preferably, the linear velocities employed are at least as high as about 300 cm. per minute.

We have found that unusually great increases in the yield are obtained by increasing the linear velocity substantially above the minimum linear velocities just disclosed. These unusual increases in the yield are explained, we believe, by the fact that the presence of the triplet atom, at the contact times and velocities just disclosed, is little or no help to the reaction and actually appears to be detrimental. This fact may be demonstrated as follows:

A procedure, run C, was carried out using substantially the conditions described for runs A and B, with the exception that the apparatus was altered so that a light filter might be employed in conjunction with the lamp. The light filter employed was capable of transmitting light of wave length 2537 A. but would not transmit light of wave length 1849 A. It will thus be seen that with the filter in place only the triplet atom reaction could take place, and with the filter removed both the singlet and the triplet atom reactions could take place. Under these conditions, it was found that no hydrazine was produced when the filter was in position, but an appreciable yield of hydrazine was obtained when the filter was removed. This conclusively demonstrates that the triplet atom alone does not help in the production of hydrazine under the conditions just described. In fact, it appears that the triplet atom, in one or more of its three energy states, contributes materially to the destruction of hydrazine, along the lines of the reaction of Equation 8, under the conditions just described.

Another aspect of the present invention is based upon the discovery that by very materially increasing the linear velocities of the vapor stream here involved it is possible to completely change the function of the triplet atom from that of a hydrazine destroyer to that of a hydrazine producer.

The procedure here involved is as follows:

A series of runs were made in a modified apparatus that is substantially larger than the apparatus hereinbefore described, having a lamp which is in the form of a helically wound optical envelope wrapped about a quartz enclosed irradiation zone. The receiver was maintained at −195° C. In the apparatus here used the optical envelope is made of high silica glass (Vycor 7910) which absorbs light of wave length 1849 A. but transmits light of wave length 2537 A. The photosensitization reaction using the triplet atom exclusively may thus be studied.

The table below shows the results obtained in this series of runs and more specifically describes the various procedures used by specifying the flow rates in cubic feet per hour (ft.$^3$/hr.) in column 2 and in centimeters per second (cm./sec.) in column 6, the pressure in the reaction zone in mm. of mercury in column 3, the rate of hydrazine production in milliliters per hour (ml./hr.) in column 4, and the percent yield or conversion of ammonia to hydrazine on the basis of the amount of ammonia consumed in column 5.

Table

| Run | Flow, ft.$^3$/hr. | Press., mm. Hg | $+N_2H_4$, ml./hr. | Percent Yield | cm./sec. $\times 10^{-3}$ |
|---|---|---|---|---|---|
| D | 6 | 5-10 | 3.32 | 20.0 | 8.5 |
| E | 5 | 7-8 | 4.03 | 20.2 | 8.1 |
| F | 15-16 | 17 | 13.19 | 53.3 | 11.8 |
| G | 20 | 20 | 14.30 | 59.2 | 12.9 |
| H | 10 | 10-12 | 9.12 | 35.4 | 11.7 |
| I | 10 | 21-22 | 8.02 | 33.3 | 6.1 |
| J | 10 | 33 | 8.34 | 37.4 | 3.9 |
| K | 25 | 25.28 | 15.28 | 57.6 | 12.3 |
| L | 30 | 30 | 15.15 | 67.2 | 13.1 |
| M | 35 | 35-40 | 18.24 | 72.0 | 13.0 |

If a procedure is carried out that is the same as the foregoing run M except that a quartz envelope for the lamp is used so as to permit transmission of light of wave length 1849 A. into the irradiation zone and the other conditions are maintained favorable to mercury photosensitization then the hydrazine production is 30–35 ml./hr. depending upon the ease with which the quartz transmits light of the wave lengths 1849 A. and 2537 A.

It will thus be seen that in instances wherein it is desired to employ light wave length 2537 A. as the principal (more than about 80%) energy source the linear velocity is preferably at least about 1000 cm./sec. and most preferably about 10,000–20,000 cm./sec. Higher speeds may be used. The contact time employed is preferably less than about 0.01 sec. and most preferably about 0.001–0.0001 sec. Again, it may be possible in commercial practice to obtain higher speeds and shorter contact times; and such would ordinarily be advantageous since the initial photosensitization of the mercury vapor is practically an instantaneous reaction.

It will also be understood that in using light of both photosensitizing wave lengths (i. e. 1849 A. and 2537 A.) the most preferred conditions are those just recited so that maximum benefit may be obtained from both wave lengths. However, if an appreciable amount of light of wave length 1849 A. is to be used it is possible to obtain hydrazine production without the use of such high speeds and short contact times, as has been described hereinafter. In order to obtain real benefit from light of wave length 2537 A. however, the high speed and short contact time conditions just described should be used, and this is a particularly important aspect of our invention since it makes possible the conversion of such light from a detrimental to a helpful agent. Under the latter condition a very substantial amount of the power input of the lamp used is employed effectively in the mercury photosensitization reaction.

It will be understood that modifications and variations may be effected without departing from the scope of the novel concepts of the present invention.

We claim as our invention:

1. A process for producing hydrazine by mercury photosensitization of ammonia to yield hydrazine, that comprises simultaneously subjecting a fast flowing stream of ammonia and mercury vapor at room temperature, having a linear speed of at least 10,000 cm. per second, to exposure by photosensitizing light for a time less than 0.01 second but at least sufficient to permit photosensitization and subsequent quenching of the mercury atoms in the stream and immediately thereafter condensing the condensable gases in the stream so as to effect a pressure drop in the stream during such exposure.

2. A process for producing hydrazine by mercury photosensitization of ammonia to yield hydrazine, that comprises simultaneously subjecting a fast flowing stream of ammonia and mercury vapor to exposure by activatingly absorbable light, said stream flowing at a linear rate of at least 10,000 cm. per second, and immediately thereafter condensing the condensable gases in the stream so as to effect a pressure drop in the stream during such exposure.

References Cited in the file of this patent

UNITED STATES PATENTS 974,741     Blackmore _____ Nov. 1, 1910

OTHER REFERENCES

Gedye et al.: Journal Chemical Society, 1932, pp. 1160–1169.

L. F. Audrieth et al.: The Chemistry of Hydrazine, published by John Wiley & Sons, Inc., New York, 1951, pp. 22–24.

Carleton Ellis et al.: The Chemical Action of Ultraviolet Rays, published by Reinhold Publishing Co., New York, 1941, pp. 257–259, and 318–323.